US008479295B2

(12) United States Patent
Sahita et al.

(10) Patent No.: US 8,479,295 B2

(45) Date of Patent: Jul. 2, 2013

(54) METHOD AND APPARATUS FOR TRANSPARENTLY INSTRUMENTING AN APPLICATION PROGRAM

(75) Inventors: Ravi L. Sahita, Portland, OR (US); David M. Durham, Beaverton, OR (US); Prashant Dewan, Hillsboro, OR (US); Manohar R. Castelino, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 285 days.

(21) Appl. No.: 13/076,378

(22) Filed: Mar. 30, 2011

(65) Prior Publication Data

US 2012/0255015 A1 Oct. 4, 2012

(51) Int. Cl.

*G06F 12/14* (2006.01)
*G06F 9/44* (2006.01)

(52) U.S. Cl.

USPC .......... 726/24; 717/130

(58) Field of Classification Search

USPC .......... 726/24; 717/130

See application file for complete search history.

(56) References Cited

U.S. PATENT DOCUMENTS

| | | | | |
|---|---|---|---|---|
| 5,598,553 | A * | 1/1997 | Richter et al. | 703/23 |
| 5,710,724 | A * | 1/1998 | Burrows | 714/34 |
| 6,993,665 | B2 | 1/2006 | Heddings et al. | |
| 7,146,607 | B2 | 12/2006 | Nair et al. | |
| 7,313,734 | B2 * | 12/2007 | DeWitt et al. | 714/45 |
| 7,797,747 | B1 | 9/2010 | Ferrie | |
| 7,886,126 | B2 * | 2/2011 | Bennett et al. | 711/206 |
| 7,886,293 | B2 * | 2/2011 | Anderson et al. | 718/1 |
| 2010/0011186 | A1 | 1/2010 | Bennett et al. | |
| 2010/0031353 | A1 | 2/2010 | Thomas et al. | |
| 2010/0306849 | A1 | 12/2010 | Zheng et al. | |

OTHER PUBLICATIONS

International Search Report and Written Opinion from related case PCT/US2011/067796, mailed Aug. 7, 2012, 9 pages.

Willems et al., Toward Automated Dynamic Malware Analysis Using CWSandbox, IEEE Security and Privacy archive IEEE Security and Privacy archive,vol. 5 Issue 2, Mar. 2007.

Neiger, et al., "Intel Virtualization Technology: Hardware Support for Efficient Processor Virtualization," Intel Technology Journal vol. 10, Issue 03, Published Aug. 10, 2006.

* cited by examiner

*Primary Examiner* — Tae Kim
*Assistant Examiner* — Shu Chun Gao
(74) *Attorney, Agent, or Firm* — Grossman, Tucker, Perreault & Pfleger, PLLC

(57) ABSTRACT

Generally, this disclosure describes systems and methods for transparently instrumenting a computer process. The systems and methods are configured to allow instrumenting executable code while permitting legacy memory scanning tools to monitor corresponding uninstrumented executable code stored in memory.

19 Claims, 6 Drawing Sheets

METHOD AND APPARATUS FOR TRANSPARENTLY INSTRUMENTING AN APPLICATION PROGRAM

FIELD

The disclosure relates to instrumenting an application program, more particularly to transparently instrumenting the application program.

BACKGROUND

Many electronic devices include processors configured to execute one or more application programs. Electronic devices include, but are not limited to, computers (e.g., desktop, portable, laptops, tablet, handhelds, etc.) and smart phones. Such electronic devices may be connected to other electronic devices (both known and unknown) via a network and are susceptible to a number of security threats. Security threats may include, for example, malicious programs ("malware"), exposure of personal information and/or exposure of critical information. Malware may include virus applications, email viruses, spyware, applications configured to disable anti-virus applications and/or applications configured to mimic a web site, e.g., banking web sites, in order to capture a user's password.

Anti-malware software and/or hardware components (also referred to as an anti-malware engine) have been developed to fight against malware. Anti-malware components are typically configured to detect malware and to take action in response to detecting malware. Such actions include, but are not limited to disabling the malware, disabling the electronic device, alerting a supervisor program and/or alerting a user. For example, an anti-malware component such as an anti-virus component or a host intrusion prevention component may be configured to "instrument" an operating system (OS) kernel at certain points in order to monitor actions of an untrusted application program. The anti-malware component may then be configured to determine whether an untrusted application program is violating any rules of the anti-malware component. Such rule violations are configured to indicate that the untrusted application program is in fact malware.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
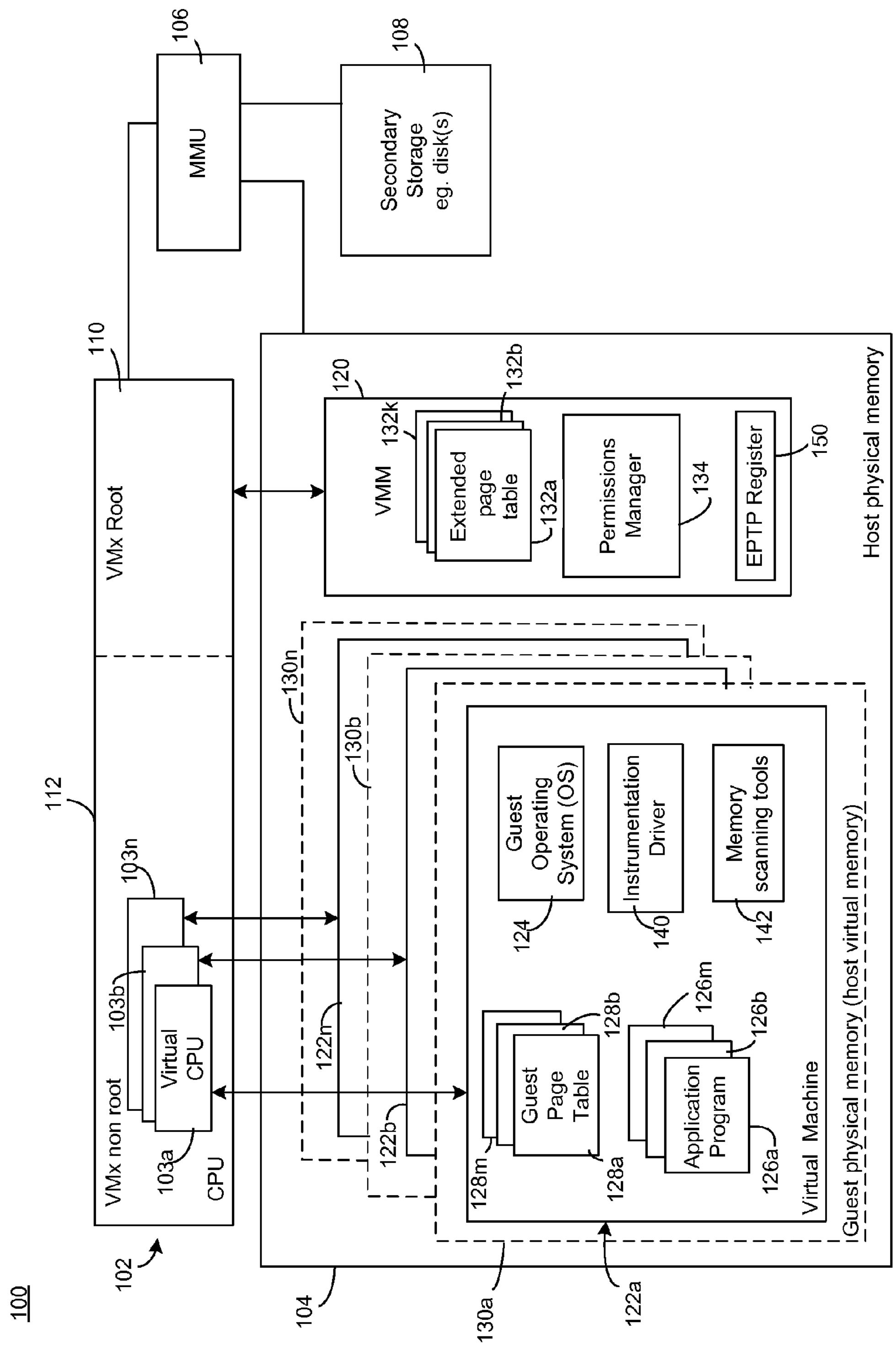
FIG. 1 illustrates one exemplary embodiment of a system consistent with the present disclosure.

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A method and apparatus consistent with the present disclosure are configured to allow instrumenting an application program whether or not the application program is itself configured for instrumenting. The instrumenting is configured to be transparent to a memory scanner so that the memory scanner may continue to operate properly in the presence of the instrumenting. The memory scanner may read physical memory addresses corresponding to the application program independent of any instrumenting that may be present.

"Instrumenting" corresponds to an ability to introduce new behavior into an existing program in order to monitor the program's behavior, e.g., for security, debugging, performance and/or testing. Anti-malware components may use instrumenting techniques to detect and prevent potential malicious activity in a program. Code interposition is one instrumenting technique and includes binary patching. Binary patching includes an executable code modification method where the modifications are configured to allow an anti-malware component to monitor the existing program's behavior. For example, the binary patch may be configured to transfer control from the instrumented application program to the anti-malware component during program execution. The anti-malware program may then review the context in which the instrumented application program was called. "Executable code" corresponds to the executable application program or a portion of the executable application program.

Another instrumenting technique utilizes callback APIs (application programming interfaces) in order to instrument an existing application program. A callback is a reference to executable code or a piece of executable code that is passed as an argument to other executable code. For example, a callback may include passing a function pointer as an argument. An application programming interface is a set of functions and data structure definitions that one application program may use to access and use services and resources of another application program that implements the API. When callback APIs are utilized for instrumenting an existing application program, the existing application program provides the callback APIs. However, not all existing application programs provide callback APIs and those that do may not provide an opportunity to instrument all desired control points. This may interfere with an ability to instrument an existing application program.

An anti-malware component, for example, may initiate binary instrumentation configured to modify or overwrite an instruction sequence of the executable code associated with a target application program or module. Upon execution of the instrumented application program, the modified instruction sequence is configured to cause execution control to transfer to an anti-malware component. The anti-malware component may then review the context in which the application program was called. The anti-malware component may then determine whether the context in which the application program was called violates any rules that may indicate that the application program has been corrupted by malicious software.

Instrumenting techniques that modify the executable code may interfere with the operation of memory scanners such as legacy in-memory virus scanners. Memory scanners may include hardware or software components that are configured to read physical memory and perform comparison of the contents of the physical memory with a predefined reference. For example, memory scanners may be used to detect virus programs that may be resident in physical memory. Instrumented executable code may be classified as malware by the memory scanner since the instrumented executable code differs from the original executable and the memory scanner is unlikely to have visibility to the instrumenting.

The method and apparatus consistent with the present disclosure are configured to store two versions of at least a portion of a target application program in host system physical memory. One version includes the original uninstrumented target application program executable code and the other version includes an instrumented copy of the target application program executable code. The versions of the code may be stored at blocks of memory referred to as pages. Each page may have an associated address and the page size may be fixed or variable. Access permissions may be set to read only for the host physical address of the uninstrumented target application program executable code pages and may be set to execute only for the instrumented target application program executable code pages. The instrumented target application program may be executed and/or the uninstrumented target application may be read based on, at least in part, the access permissions. Various methods may be used to manage access to the two versions of the target executable code, as will be described in greater detail below.

In a first embodiment, an extended page table associated with a virtual machine monitor (VMM) may be used to control access to one of the two versions depending on whether the target application program or the memory scanning tool is being executed. A guest physical address may be configured to point to either the original version or the instrumented version. Each entry in the extended page table includes a host physical address associated with a code page in the host physical memory as well as a permission field. The permissions include read (R), write (W) and execute (X) and any combination thereof. For example, the permissions may be restricted to read only (RO) or execute only (XO). The permissions are typically used to control access to the pages in the physical memory. In this embodiment, these permissions and a page fault functionality associated with the VMM may be utilized to ensure that the instrumented application program is executed and a memory scanner reads the original application program.

In other embodiments, two extended page tables may be implemented. A first extended page table is configured to point to the original, uninstrumented target executable code stored in host physical memory (permissions set to read-only) and a second extended page table is configured to point to the instrumented copy of the target executable code stored in host physical memory (permissions set to execute-only). In a second embodiment, for example, the memory scanning tools may be instrumented with one or more instructions configured to select the appropriate extended page table to ensure that the instrumented application program is executed and a memory scanner reads the original application program without using page fault functionality. In a third embodiment, two extended page tables may be implemented, and a page fault functionality associated with a VMM may be utilized to ensure that the instrumented application program is executed and a memory scanner reads the original application program.

The first embodiment may use the VMM (also referred to as a hypervisor) to ensure the appropriate version of the target executable code is accessed while the second embodiment is configured to instrument the memory scanning tools and use the extended page tables, without invoking the VMM, to ensure the memory scanning tools read the uninstrumented version of the target executable code. The third embodiment may use the VMM and a plurality of extended page tables to ensure the memory scanning tools read the uninstrumented version of the target code. Advantageously, any point(s) in any application program may be instrumented and legacy memory scanners may safely scan physical memory without returning a false mismatch between the scanned code pages in host physical memory and their predefined reference.

System Architecture

FIG. 1 illustrates one exemplary embodiment of a system 100 consistent with the present disclosure. The system 100 generally includes processor CPU 102 and system memory, e.g., host physical memory 104. The system 100 may include a memory management unit MMU 106 and secondary storage, e.g., disk(s) 108. The MMU 106 may be configured to manage memory access requests from CPU 102 to memory 104 and/or secondary storage.

The system 100 is configured to support virtualization of its resources, including the CPU 102 and host physical memory 104. As is known, virtualization allows sharing of system resources by multiple processes. A supervising process, e.g., a virtual machine monitor (VMM) may manage the sharing and act as an interface between one or more virtual machines (VMs) and the host resources, e.g., CPU 102 and memory 104. Accordingly, the VMM has access to and control of system 100 while each VM has access to resources via the VMM and shares the resources with other VMs. Each VM is typically unaware that the resources are shared.

The CPU 102 may include a plurality of modes of operation that may be used to support virtualization. For example, the CPU 102 may include a privileged mode (VMx root) 110 and a non-privileged mode (VMx nonroot) 112. A VMM 120 may use the privileged mode 110 and VMs **122*a*, 122*b*, . . . , 122*n* may use the non-privileged mode 112. For example, a plurality of VMs 122*a*, 122*b*, . . . , 122*n* may execute on a plurality of virtual CPUs 103*a*, 103*b*, . . . , 103*n* in the VMx non-root mode 112**. Because of virtualization, execution of some instructions by a VM (i.e., VMx non-root mode) and certain events may cause control to transfer to the supervisor or VMM (i.e., Vmxroot mode), e.g., page faults, as described herein.

Host physical memory 104 is configured to store the VMM 120 and one or more VMs **122*a*, 122*b*, . . . , 122*n*, generically VM 122. The VMM 120 may include one or more extended page table(s) 132*a*, 132*b*, . . . , 132*k* and a permissions manager 134, as described herein. Each extended page table 132*a*, 132*b*, . . . , 132*k* may have a corresponding extended page table base pointer (EPTP) corresponding to a base address of the respective extended page table. The VMM 120 may include an EPTP register 150** configured to store the EPTP associated with a selected extended page table (corresponding to a guest page table).

For ease of explanation, a VM is described herein. As will be understood by those skilled in the art, the description may be applied to any one or more of the plurality of VMs **122*a*, 122*b*, . . . , 122*n* in system 100. VM 122 may include a guest operating system (OS) 124 and one or more application programs 126*a*, 126*b*, . . . , 126*m*, generically 126**.

In a non-virtualized system, an operating system typically manages the system physical memory and sharing of the physical memory by a plurality of application programs that may utilize the system physical memory. Each application program may be configured to utilize a "linear address space" that is the application program's view of its memory space. The linear address space may be divided into blocks, i.e., code pages, corresponding to some number of bytes of executable code. The size of the code pages may vary or may be fixed. The application program is typically ignorant of the placement of the code pages in physical memory. This allows the application program to be compiled without consideration of the actual physical addresses associated with its code pages and allows the OS to place the code pages in physical memory in a manner that best utilizes the host physical memory. The OS manages placing pages in physical memory and further manages translation, i.e., mapping, linear address space addresses to physical memory addresses. The mapping is implemented using page tables where, typically, the linear address is a pointer (index) into the page table and each page table entry includes the address in physical memory (physical address) corresponding to the associated linear address. Each application program may have an associated page table and the OS is configured to manage the page table and placement of each executable code page of the executing application programs into the physical memory.

In a virtualized system, each guest OS may manage only a respective guest physical memory 130*a*, 130*b*, . . . , 130*n*, generically 130. In the virtualized system, each guest physical memory corresponds to host virtual memory. In other words, the memory addresses used by the guest OS may point to addresses in memory but these addresses may not be actual host physical addresses. The VMM 120 manages the actual (host) physical memory 104 and the translation from guest physical memory 130 (host virtual memory) to host physical memory 104. In other words, from the view of a VM and its associated guest OS, the VM is managing guest physical memory and translation of application linear addresses to guest physical memory addresses. From the view of the VMM, the VMM is managing the actual physical memory (host physical memory 104) and translation from guest physical memory 130*a* (host virtual memory) to host physical memory 104.

In the system 100, each VM 122*a*, 122*b*, . . . , 122*n* may then include a number of page tables 128*a*, 128*b*, . . . , 128*m*, generically 128, where each page table 128*a*, 128*b*, . . . , 128*m* is associated with a respective application program 126*a*, 126*b*, . . . , 126*m*. The page tables 128*a*, 128*b*, . . . , 128*m* are managed by the guest OS (e.g., guest OS 124) and are configured to provide address translation (mapping) from the application linear address space to the guest physical memory. The VMM 120 is configured to translate the guest physical address to a host physical memory address.

The VMM 120 utilizes the extended page tables 132*a*, 132*b*, . . . , 132*k* to provide address translation from guest physical memory 130 to host physical memory 104. Similar to the VM page tables, the guest physical address may act as a pointer (index) into an extended page table 132*a*, 132*b*, . . . , 132*k* and each extended page table entry may include the corresponding host physical address. In this manner, address mapping between application linear addresses and guest physical memory addresses is separated from mapping between guest physical addresses and host physical addresses.

Figure 2:
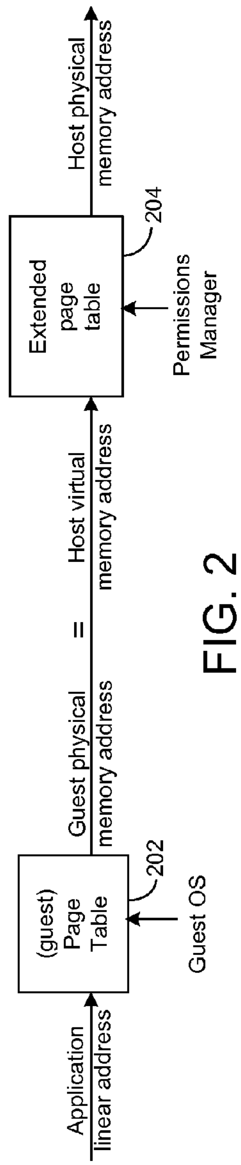
FIG. 2 illustrates addressing between a guest page table and an extended page table consistent with the present disclosure.

FIG. 2 illustrates address mapping from an application linear address space to a corresponding host physical memory address. An application linear address may index into an associated page table 202 whose entries correspond to guest physical memory addresses. This page table 202 may be managed by an associated guest OS. The guest physical memory address pointed to by the application linear address may then index into an extended page table 204, managed by a permissions manager (e.g., Permissions Manager 134 in FIG. 1). The entries in the extended page table 204 may correspond to host physical memory addresses. In this manner, an application linear address may have a corresponding host physical address where the guest OS manages mapping only to a guest physical address and a VMM manages mapping from the guest physical address to the host physical address.

Each extended page table entry may further include a permissions field identifying permissions (e.g., read, execute and/or write), which may be managed by Permissions Manager 134. Permissions are associated with code pages in physical memory and are configured to control access (e.g., by type of access) to the code pages in physical memory. For example, if an application attempts to read a code page that has permission set to execute only, a read page fault is generated. In another example, if an application attempts to execute a code page that has permission set to read only, an execute page fault is generated. A page fault may cause control to be transferred from the VM and associated guest OS to the VMM 120 and/or the Permissions Manager 134. Page faults may be utilized as described herein to support transparent instrumenting of an application program while allowing operation of a memory scanner.

Referring back to FIG. 1, VM 122*a* includes guest OS 124 and may include instrumentation driver 140 and memory scanning tools 142. Instrumentation driver 140 is configured to instrument a target application program (e.g., application program 126*a*) by modifying the target application program's executable code, for example, in response to operation of an anti-malware component. The memory scanning tools 142 are configured to scan guest physical memory, read code pages and to compare read code pages with a predetermined reference, as described herein. In one example application, the target application program is instrumented (e.g., by an anti-malware component) for the purpose of detecting malicious programs and the memory scanning is performed for the purpose of detecting malicious programs.

A method consistent with the present disclosure is configured to utilize the extended page table(s) to control access to an instrumented target application program's executable code or to the target application program's original uninstrumented executable code. In one embodiment, one extended page table may be utilized and access may be controlled using the VMM (and Permissions Manager) and associated page fault functionality, as described herein. In another embodiment, the memory scanning tools may be instrumented with one or more instructions configured to select between a first extended page table associated with the target application program's original uninstrumented executable code and a second extended page table associated with the instrumented target application program's executable code, as described herein. In a third embodiment, a plurality of extended page tables may be utilized and access may be controlled using the VMM (and Permissions Manager) and associated page fault functionality.

Two versions of the target application executable code may be stored in host physical memory as described herein. When the extended page table entry pointed to by a guest physical address corresponds to the host physical address of the instrumented executable code, the permissions may be set to execute only. When the extended page table entry pointed to by the guest physical address corresponds to the host physical address of the original uninstrumented executable code, the permissions may be set to read only. The guest physical address may be provided by guest OS 124. The guest OS 124 may be unaware that the two versions of the target application executable code pages may be present in host physical memory. Thus, whether the guest physical address ultimately points to the original uninstrumented target executable code pages or to the instrumented target executable code pages depends on the selected extended page table and/or the contents of the extended page table entry that corresponds to the guest physical address.

Figure 3A:
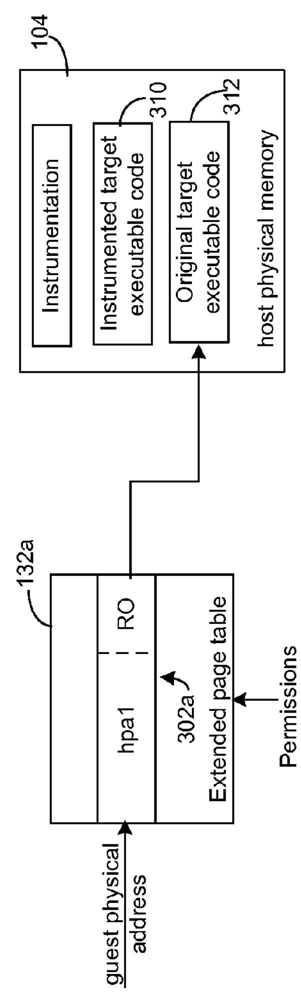
FIGS. 3A and 3B illustrate examples of extended page table entries consistent with the present disclosure.
Figure 3B:
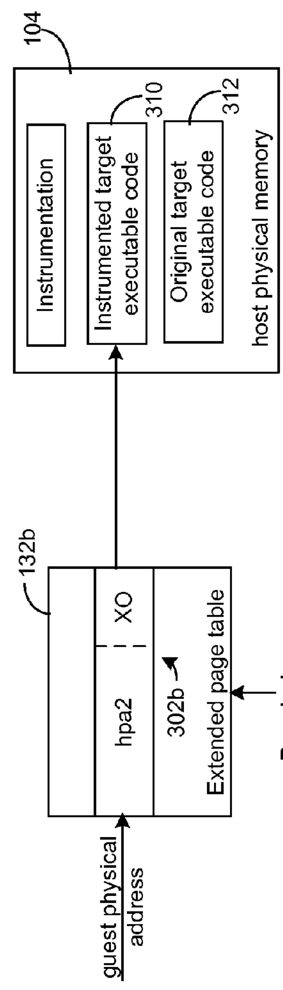

FIGS. 3A and 3B illustrate examples of extended page table entries consistent with the present disclosure. In some embodiments, the extended page tables 132*a* and 132*b* may be the same extended page table (with different entries at different times). In other embodiments, the extended page tables 132*a*, 132*b* may be two different extended page tables (that may both exist at the same time), as described herein. In both FIGS. 3A and 3B, a guest physical address indexes into the extended page table(s) 132*a* and 132*b* and points to a page table entry 302*a* or 302*b*. In the extended page table 132*a* of FIG. 3A, the contents of the page table entry 302*a* correspond to the address hpa1 of the original uninstrumented target application program executable code page 312 in host physical memory 104, with permission set to read only (RO). In the extended page table 132*b* of FIG. 3B, the contents of the page table entry 302*b* correspond to the address hpa2 of the instrumented target application program executable code page 310 in host physical memory 104, with permission set to execute only (XO).

For example, if memory scanning tools attempt to read the executable code corresponding to the guest physical address and if the extended page table entry, e.g., extended page table entry 302*a*, corresponds to the original uninstrumented executable code (i.e., hpa1), the original uninstrumented executable code may be read without a page fault being generated. On the other hand, if the extended page table entry, e.g., extended page table entry 302*b*, corresponds to the instrumented executable code (i.e., hpa2), a read page fault may be generated.

In this embodiment, the VMM and Permissions Manager are configured to manage the extended page table and may change the contents of the extended page table entry 302*a*, 302*b* in response to a page fault. For example, if a read page fault is generated, the Permissions Manager may update the extended page table entry associated with the fault to correspond to the host physical address of the original uninstrumented code page (i.e., hpa1), set the permissions to read only and return control to the VM that includes the memory scanning tools. The memory scanning tools may then read the original executable code stored at hpa1 in host physical memory 104.

In another embodiment, the memory scanning tools may be instrumented with an instruction configured to select the appropriate extended page table, e.g., extended page table 132*a* or 132*b*. For example, a first instruction may be configured to load the EPTP of the first extended page table 132*a* into the EPTP register prior to a read instruction of the memory scanning tools 142 (e.g., when the memory scanning tools begin executing and/or just prior to execution of the read instruction). Continuing with this example, the first instruction may correspond to an instruction to switch the contents of the EPTP register to a first EPTP corresponding to a first index. The first index may index into a table created by the VMM that includes a list of valid EPTPs. The effect of the first instruction is to load the EPTP (e.g., EPTP of the first extended page table 132*a*) that corresponds to the first index into the EPTP register. When the instrumented scanning tools 142 then attempt to read the contents of host physical memory corresponding to guest physical address gpa, the guest physical address may index into the first extended page table 132*a* that corresponds to the target application original executable code with permissions set to read only.

In this embodiment, a second instruction may be configured to load the EPTP of the second extended page table 132*b* into the EPTP register after the read operation (e.g., when the memory scanning tools complete and/or just after the read operation executes). Continuing with this example, the second instruction may correspond to an instruction to switch the contents of the EPTP register 150 to a second EPTP corresponding to a second index. The second index may index into the table created by the VMM that includes the list of valid EPTPs. The effect of the second instruction is to load the EPTP (e.g., EPTP of the second extended page table 132*a*) that corresponds to the second index into the EPTP register. If the target application is then executed, the guest physical address may index into the second extended page table 132*b* and the instrumented target application executable code may execute. This embodiment may be relatively more efficient compared to the first embodiment because it is not configured to invoke the VMM or hypervisor in order to switch between the original and instrumented copy target application executable code pages.

In a third embodiment, the VMM and permission manager are configured to manage a plurality of extended page tables and may change the EPTP register to select the appropriate extended page table 132*a* or 132*b* in response to a page fault. This embodiment may be relatively more efficient compared to the first embodiment as it potentially reduces the amount of page faults and VMM invocations when the memory scanner launches. Also it may be performed without instrumenting the memory scanning code.

Exemplary Methodology

Figure 4:
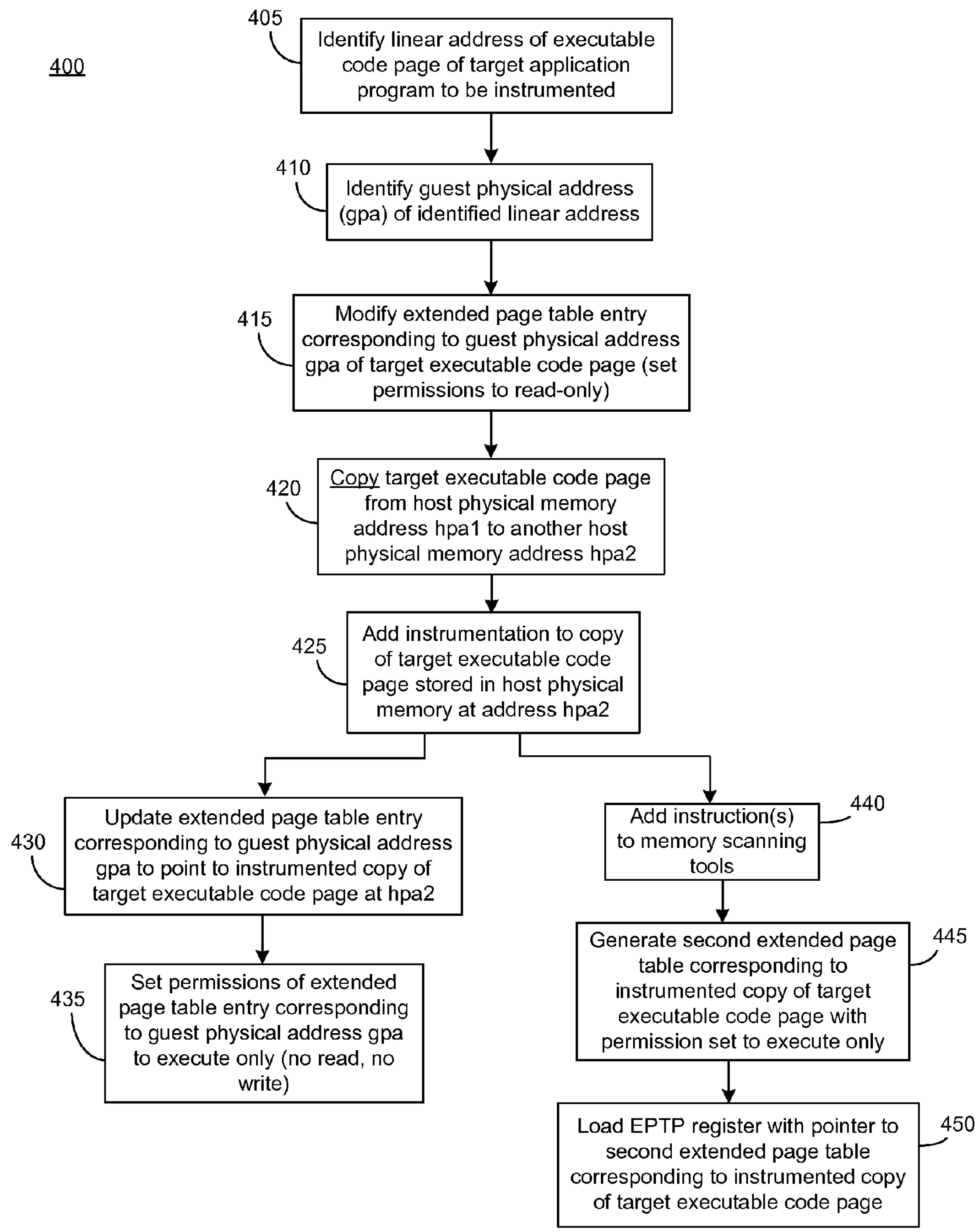
FIG. 4 illustrates a flowchart of exemplary initialization operations consistent with the present disclosure.

FIG. 4 illustrates a flow chart 400 of exemplary operations for initializing transparent instrumentation of a target application program consistent with the present disclosure. The operations illustrated in this embodiment may be performed by circuitry and/or software modules associated with system 100 (e.g., CPU 102). Program flow may begin at operation 405. Operation 405 includes identifying a linear address of an executable code page of a target application program that is to be instrumented, for example, using the instrumentation driver 140. For ease of description, a single code page is referenced below; although one or more executable code pages of the target application may be identified and the operations described may apply to multiple code pages. A guest physical memory address (gpa) corresponding to the identified linear address may be identified at operation 410. The instrumentation driver 140 may interface with the Permissions Manager 134 to identify the address (gpa) of the guest physical page corresponding to the identified application linear address. For example, the instrumentation driver 140 may read the page table (guest) to determine the guest physical address corresponding to the identified application linear address. The instrumentation driver 140 may then provide the guest physical address to the Permissions Manager 134.

Operation 415 may include modifying an extended page table entry corresponding to the guest physical address (gpa) of the target application executable code page so that the permissions are read-only (in a first extended page table). For example, the Permissions Manager 134 may be configured to edit the extended page table entry that maps the guest physical address to the host physical memory address (hpa1) that corresponds to the target executable code page to be instrumented to set the associated permissions to read-only.

The target executable code page may then be copied from the host physical memory address (hpa1) to another host physical memory address (hpa2) at operation 420. After operation 420, an original target executable code page may exist in host physical memory at address hpa1 and the copy of the target executable code page may exist in host physical memory at address hpa2. The copy of the target executable code page may be located in host physical memory accessible only to the VMM 120.

The copy of the target executable code page may be instrumented at operation 425. The Permissions Manager 134 may be configured to update the copy of the target executable stored at a host physical address hpa2 with instrumented executable code as described herein. For example, the instrumentation may be configured to transfer control from the instrumented target application program to an anti-malware component, as described herein.

At operation 430, the extended page table entry corresponding to the guest physical address (gpa) of the target executable code page may be updated to point to the host physical address (hpa2) of the instrumented copy of the target executable code page (in the first extended page table). The permissions associated with this extended page table entry (pointing to the instrumented copy of the target executable code page) may be set to execute only (i.e., no read, no write) at operation 435 (in the first extended page table).

At operation 440, the memory scanning tools may be instrumented by adding instruction(s) to the memory scanning tool executable code. The instruction(s) are configured to select an appropriate extended page table, as described herein. For example, the instruction(s) may include request(s) to switch an EPTP index to a first EPTP index or a second EPTP index that index into a table of valid EPTPs. Operation 445 may include generating a second extended page table corresponding to the instrumented copy of the target executable code (with permission set to execute only). An EPTP register may be loaded with a pointer to the second extended page table corresponding to the instrumented copy of the target executable code page at operation 450.

The instrumentation driver 140, for example, may be configured to interface with the Permissions Manager 134 to initialize a plurality of extended page tables (each with an associated EPTP) and to instrument the memory scanning tools 142 with an instruction configured to select an appropriate extended page table from the plurality of extended page tables 132*a*, 132*b*, . . . , 132*k*. For example, the selecting may include loading the appropriate EPTP into the EPTP register 150 (see FIG. 1). In other embodiments, the instrumentation driver may be configured to interface with the Permission Manager 134 to initialize a plurality of extended page tables (each with an associated EPTP) but choose not to instrument the memory scanning tools, and continue to utilize page faults to select an appropriate extended page table from the plurality of extended page tables 132*a*, 132*b*, . . . 132*k*.

Depending on the desired functionality, all or fewer than all of the operations of flow chart 400 may be performed. Operation 405 through operation 425 may typically be performed in all implementations. For example, operations 430 and 435 may be performed and operations 440, 445 and 450 may not be performed. In another example, operations 440, 445 and 450 may be performed and operations 430 and 435 may not be performed. In yet another example, operations 430, 435, 445 and 450 may be performed and operation 440 may not be performed. In this manner, access to the two versions of the target executable code pages may be managed using the VMM and page fault functionality and/or by instructions in the instrumented memory scanning tools using two extended page tables.

Thus, at the end of these initialization operations, the original, uninstrumented target code page may exist in host physical memory at address hpa1. The instrumented copy of the target code page may exist in the host physical memory at address hpa2. The extended page table entry corresponding to guest physical address gpa of the target application executable code page may contain host physical memory address hpa2 (i.e., instrumented executable code page) and the permissions may be set to execute only (XO).

When the target application (e.g., application 126*a*) is executed, the instrumented copy of the code page (at host physical memory address hpa2) is configured to execute based on the extended page table entry. If the memory scanning tools 142 are launched (e.g., by OS 124), and the memory scanning tools 142 attempt to read the code page at guest physical address gpa (that points to the host physical address hpa2 of the instrumented copy of the executable code page), then a read fault may be generated since the permission for hpa2 is set to execute only. A read fault may transfer control to a supervisor (e.g., the VMM 120 and the Permissions Manager 134). The Permissions Manager 134 may be configured to update the extended page table entry pointed to by guest physical address gpa from host physical address hpa2 (i.e., instrumented target code page) to host physical address hpa1 (i.e., original, uninstrumented target code page). The Permissions Manager 134 may be further configured to set the associated permission to read only (i.e., no execute, no write). Control may then return to the VM 122*a* and the memory scanning tools 142. The memory scanning tools 142 may then read the host physical memory address hpa1 and the original target executable code page. In this manner, utilizing the extended page table and the associated page fault functionality, instrumented target code pages may be executed and original target code pages may be read.

Figure 5:
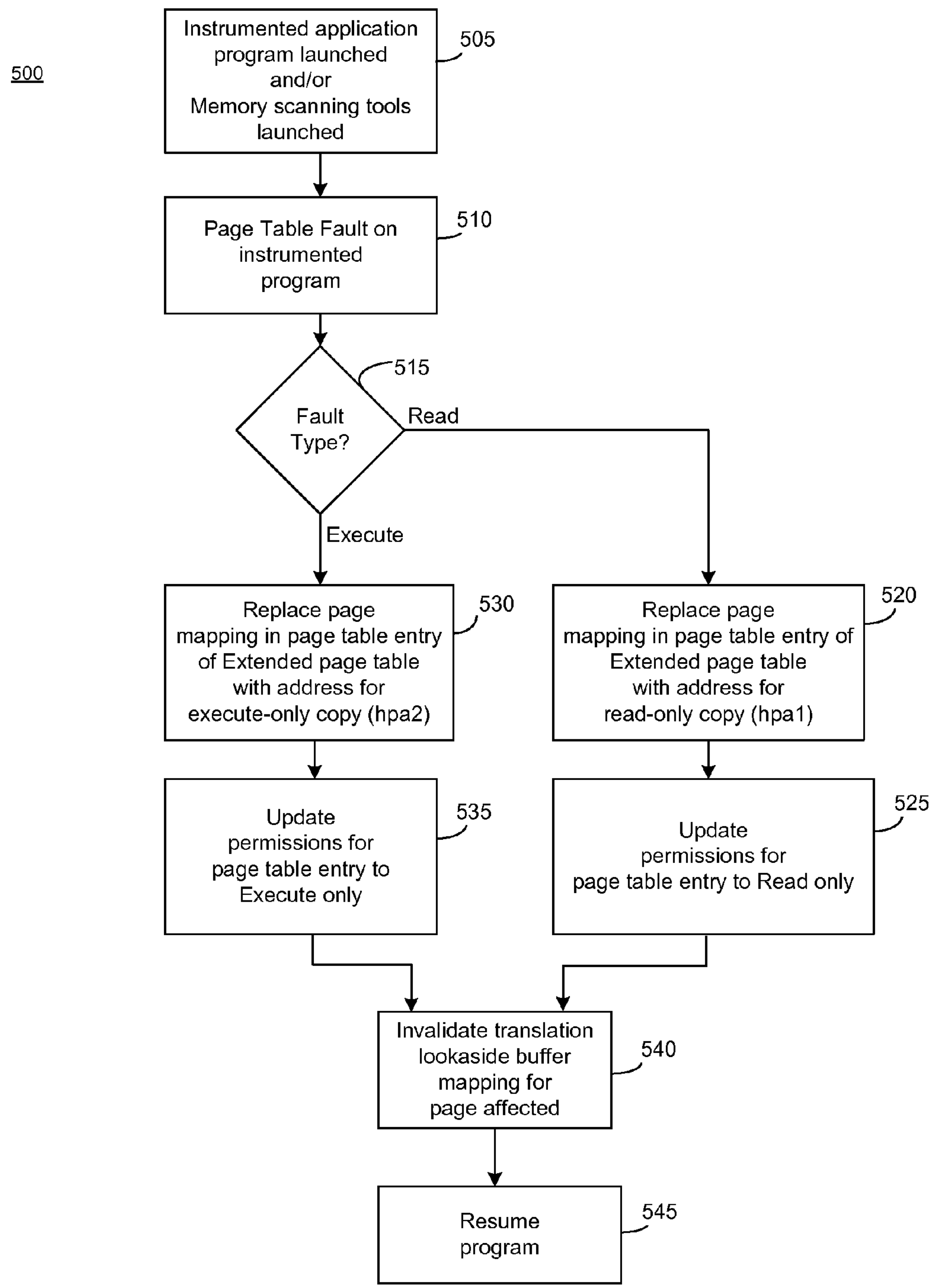
FIG. 5 illustrates a flowchart of exemplary operations for using a hypervisor to manage access to two versions of target executable code consistent with the present disclosure.

FIG. 5 illustrates an exemplary flow chart 500 of operations consistent with the present disclosure. It is assumed that at least some of the operations of flow chart 400 have been performed prior to the operations of flow chart 500. In particular, it is assumed that at least operations 405-425 and operations 430 and 435 have been performed. Flow may begin at operation 505. Operation 505 includes launching an instrumented application program and/or launching memory scanning tools. The instrumented application program and/or memory scanning tools may be launched by OS 124. A page table fault may be generated at operation 510. For example, if the memory scanning tools attempt to read instrumented application program code pages or the OS attempts to execute the uninstrumented application program code pages, a page fault may be generated.

A type of page fault may be determined at operation 515. For example, the page fault may be a read fault or an execute fault. A read fault may be generated if the scanning tools attempt to read the instrumented application program executable code pages (whose permissions are set to execute only in the extended page table). An execute fault may be generated if the guest OS attempts to execute the original uninstrumented application program executable code pages (whose permissions are set to read only in the extended page table).

If the page fault is a read fault, the page table entry in the extended page table may be replaced with the host physical address of the executable code pages of the original uninstrumented application program (hpa1) at operation 520. The permissions associated with this updated extended page table entry may then be set to read only at operation 525. Program flow may then proceed to operation 540.

If the page fault is an execute fault, the page table entry in the extended page table may be replaced with the host physical address of the executable code pages of the instrumented application program (hpa2) at operation 530. The permissions associated with this updated extended page table entry may then be set to execute only at operation 535. Program flow may then proceed to operation 540.

Operation 540 may include invalidating mapping in a translation lookaside buffer (TLB) for executable code page (s) affected by operations 520 and 525 or operations 530 and 535. As will be understood by those skilled in the art, a TLB corresponds to a cache for a page table (e.g., extended page table) that is configured to increase the speed of address translations (mapping). Recently used mappings may be stored in the TLB, similar to cache memory. Mappings in the TLB are invalidated in response to changing the mapping in the extended page table.

Operation 545 may include resuming the program (e.g., instrumented application program or memory scanning tools) that initiated the page fault. If the program that initiated the page fault was the memory scanning tools, then the memory scanning may resume. The original uninstrumented application program executable code pages may then be read from host physical memory. If the program that initiated the page fault was the OS launching the instrumented application program, then the instrumented application program may be executed. During execution, the instrumented application program may be configured to transfer control to an anti-malware component that monitors operation of the application program as will be understood by those skilled in the art.

Figure 6:
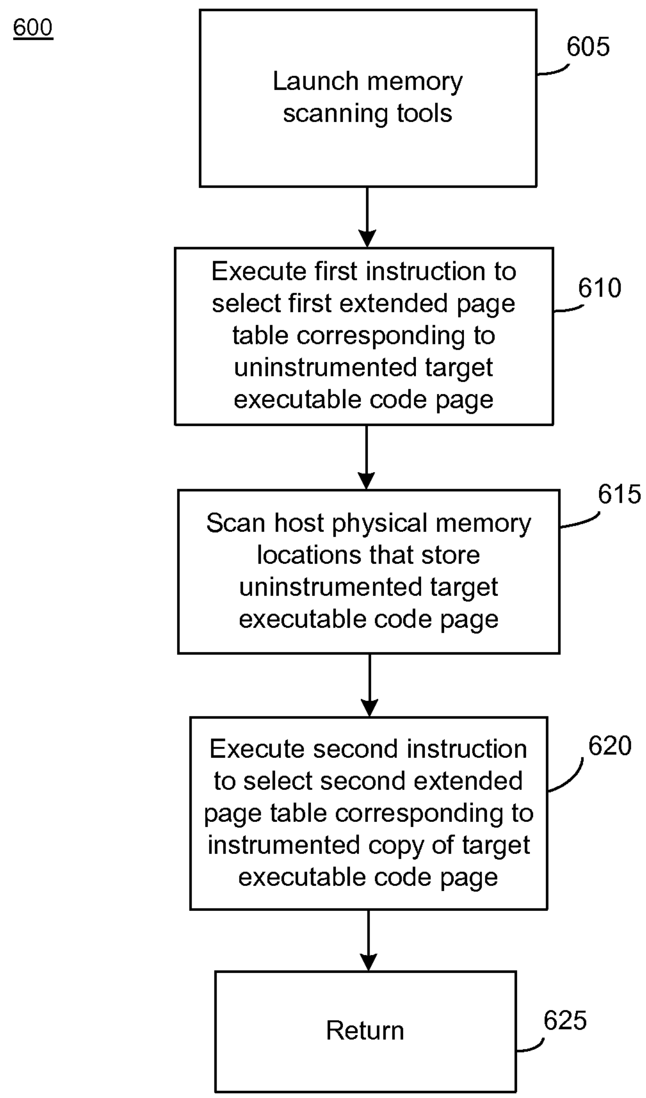
FIG. 6 illustrates another flowchart of exemplary operations for managing access to two versions of target executable code without invoking the hypervisor consistent with the present disclosure.

FIG. 6 illustrates an exemplary flow chart 600 of operations consistent with the present disclosure. It is assumed that at least some of the operations of flow chart 400 have been performed prior to the operations of flow chart 600. In particular, it is assumed that at least operations 405-425 and operations 440, 445 and 450 have been performed. Flow may begin at operation 605. Operation 605 may include launching (instrumented) memory scanning tools. The instrumented memory scanning tools may be launched by OS 124.

A first instruction may be executed at operation 610. The first instruction is associated with instrumenting the memory scanning tools, as described herein. The first instruction is configured to select a first extended page table corresponding to an uninstrumented target executable code page. For example, the first instruction may include a request to switch an index in a table of valid EPTPs and may cause the EPTP corresponding to the first extended page table to be loaded into the EPTP register. As a result, the EPTP register may include the EPTP of the first extended page table, corresponding to an uninstrumented target executable code page. Operation 615 may include scanning host physical memory locations by the memory scanning tools. The original uninstrumented target executable code pages may then be read from host physical memory. A second instruction may be executed at operation 620. The second instruction is associated with instrumenting the memory scanning tools, as described herein. The second instruction is configured to select a second extended page table corresponding to an instrumented target executable code page. For example, the second instruction may include a request to switch an index in a table of valid EPTPs and may cause the EPTP corresponding to the second extended page table to be loaded into the EPTP register. As a result, the EPTP register may include the EPTP of the second extended page table, corresponding to an instrumented target executable code page. Control may then return at operation 625. For example, program flow may return to an OS that launched the memory scanning tools.

Figure 7:
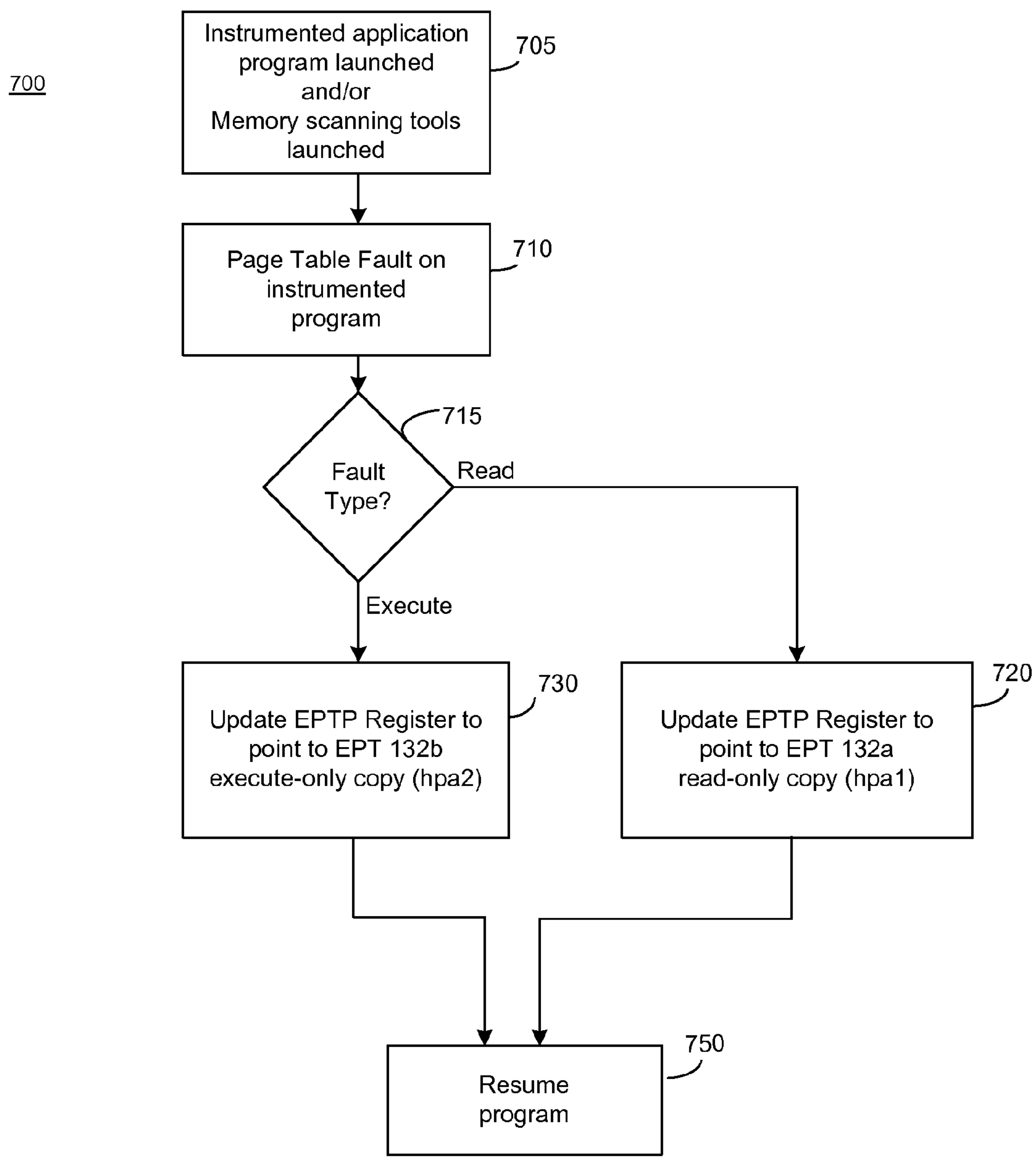
FIG. 7 illustrates another flowchart of exemplary operations for using the hypervisor to manage access to two versions of target executable code consistent with the present disclosure.

FIG. 7 illustrates an exemplary flow chart 700 of operations consistent with the present disclosure. It is assumed that at least some of the operations of flow chart 400 have been performed prior to the operations of flow chart 700. In particular, it is assumed that at least operations 405-425 and operations 445 and 450 have been performed. Flow may begin at operation 705. Operation 705 includes launching an instrumented application program and/or launching memory scanning tools. The instrumented application program and/or memory scanning tools may be launched by OS 124. A page table fault may be generated at operation 710. For example, if the memory scanning tools attempt to read instrumented application program code pages or the OS attempts to execute the uninstrumented application program code pages, a page fault may be generated.

A type of page fault may be determined at operation 715. For example, the page fault may be a read fault or an execute fault. A read fault may be generated if the scanning tools attempt to read the instrumented application program executable code pages (whose permissions are set to execute only in the extended page table). An execute fault may be generated if the guest OS attempts to execute the original uninstrumented application program executable code pages (whose permissions are set to read only in the extended page table).

If the page fault is a read fault, the VMM may be configured to load the EPTP corresponding to the first extended page table into the EPTP register at operation 720. Program flow may then proceed to operation 750.

If the page fault is an execute fault, the VMM may be configured to load the EPTP corresponding to the second extended page table into the EPTP register at operation 730. Program flow may then proceed to operation 750.

Operation 750 may include resuming the program (e.g., instrumented application program or memory scanning tools) that initiated the page fault. If the program that initiated the page fault was the memory scanning tools, then the memory scanning may resume. The original uninstrumented application program executable code pages may then be read from host physical memory. If the program that initiated the page fault was the OS launching the instrumented application program, then the instrumented application program may be executed. During execution, the instrumented application program may be configured to transfer control to an anti-malware component that monitors operation of the application program as will be understood by those skilled in the art.

A method and apparatus consistent with the present disclosure are configured to allow instrumenting an application program whether or not the application program is itself configured for instrumenting. The instrumenting is configured to be transparent to a memory scanner and may continue to operate properly in the presence of the instrumenting. Two versions of a target application program may be stored in host system physical memory. One version is the original uninstrumented target application program's executable code pages while the other version is an instrumented copy of the target application program's executable code pages.

Extended page table(s) associated with a virtual machine monitor may be used to control access to one of the two versions depending on whether the target application program or the memory scanning tool is being executed. The guest physical address may point to either the original version or the instrumented version depending on the contents of page table entry pointed to by the guest physical address. Each entry in the extended page table(s) includes a host physical address associated with a code page in the host physical memory as well as a permission field.

In one example, the permissions and a page fault functionality associated with a VMM may be used to ensure that the instrumented application program is executed and a memory scanner reads the original application program. In another example, two extended page tables may be implemented. A first extended page table is configured to point to the original, uninstrumented target executable code stored in host physical memory (permissions set to read-only) and a second extended page table is configured to point to the instrumented copy of the target executable code stored in host physical memory (permissions set to execute-only). In this example, the memory scanning tools may be instrumented with one or more instructions configured to select the appropriate extended page table to ensure that the instrumented application program is executed and a memory scanner reads the original application program without using page fault functionality. Advantageously, any point(s) in any application program may be instrumented and legacy memory scanners may safely scan physical memory without returning a false mismatch between the scanned code pages in host physical memory and their predefined reference.

While the foregoing is provided as exemplary system architectures and methodologies, modifications to the present disclosure are possible. For example, operating system 124 may be configured to manage system resources and control tasks that are run on system 100. For example, OS 124 may be implemented using Microsoft Windows, HP-UX, Linux, or UNIX, although other operating systems may be used. OS 124 shown in FIG. 1 may run in a virtual machine under a virtual machine monitor which may provide a layer of abstraction for underlying hardware to various virtual machines and operating systems running on one or more processors.

Other modifications are possible. For example, memory 104 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 104 may include other and/or later-developed types of computer-readable memory.

Embodiments of the methods described herein may be implemented in a system that includes one or more storage mediums having stored thereon, individually or in combination, instructions that when executed by one or more processors perform the methods. Here, the processor may include, for example, a system CPU (e.g., CPU 102 of FIG. 1). The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

“Circuitry”, as used in any embodiment herein, may comprise, for example, singly or in any combination, hardwired circuitry, programmable circuitry, state machine circuitry, and/or firmware that stores instructions executed by programmable circuitry.

According to one aspect there is disclosed a method. The method may include storing at least a portion of an executable application program in a host system physical memory at a first host physical address; instrumenting a copy of the portion of the executable application program and storing the instrumented copy in the host system physical memory at a second host physical address; setting a corresponding access permission to read only for the first host physical address and setting a corresponding access permission to execute only for the second host physical address; and executing the instrumented copy or reading the portion of the executable application program based, at least in part, on the access permissions.

According to another aspect there is disclosed an article, including a tangible storage medium having instructions stored thereon which when executed by a processor may result in the following operations: storing at least a portion of an executable application program in a host system physical memory at a first host physical address; instrumenting a copy of the portion of the executable application program and storing the instrumented copy in the host system physical memory at a second host physical address; setting a corresponding access permission to read only for the first host physical address and setting a corresponding access permission to execute only for the second host physical address; and executing the instrumented copy or reading the portion of the executable application program based, at least in part, on the access permissions.

In yet another aspect there is disclosed a system. The system may include host physical memory; and a processor. The processor may be configured to: store at least a portion of an executable application program in the host system physical memory at a first host physical address; instrument a copy of the portion of the executable application program and store the instrumented copy in the host system physical memory at a second host physical address; set a corresponding access permission to read only for the first host physical address and set a corresponding access permission to execute only for the second host physical address; and execute the instrumented copy or read the portion of the executable application program based, at least in part, on the access permissions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method, comprising:

storing, by a processor, at least a portion of an executable application program in a host system physical memory at a first host physical address;

instrumenting, by the processor, a copy of said portion of said executable application program and storing said instrumented copy in said host system physical memory at a second host physical address;

setting, by the processor, a corresponding access permission to read only for said first host physical address and setting a corresponding access permission to execute only for said second host physical address;

executing, by the processor, said instrumented copy or reading said portion of said executable application program based, at least in part, on said access permissions;

generating, by the processor, a first extended page table associated with said first host physical address and a second extended page table associated with said second host physical address; and instrumenting, by the processor, a memory scanner with a first instruction, said first instruction configured to select said first extended page table, wherein said memory scanner is configured to read said portion of said executable application program and said first instruction is configured to be executed prior to said memory scanner reading said portion of said executable application program.

2. The method of claim 1, further comprising:

generating, by the processor, a page fault in response to an attempt to read said second host physical address or an attempt to execute said portion of said executable application program stored at said first host physical address.

3. The method of claim 2, further comprising:

determining, by the processor, a type of said page fault; and updating, by the processor, an extended page table entry to correspond to said second host physical address if said page fault is an execute fault or to correspond to said first host physical address if said page fault is a read fault.

4. The method of claim 1, wherein a memory scanner is configured to read said portion of said executable application program.

5. The method of claim 1, further comprising:

instrumenting, by the processor, said memory scanner with a second instruction, said second instruction configured to select said second extended page table, wherein said second instruction is configured to be executed after said memory scanner has read said portion of said executable application program.

6. The method of claim 1, further comprising:

monitoring, by the processor, execution of said executable application program using said instrumented copy, wherein said monitoring is configured to detect malware.

7. The method of claim 1, further comprising:

generating, by the processor, a first extended page table associated with said first host physical address and a second extended page table associated with said second host physical address;

generating, by the processor, a page fault in response to an attempt to read said second host physical address or an attempt to execute said portion of said executable application program stored at said first host physical address; and selecting, by the processor, one of said first and second extended page tables in response to the page fault.

8. system comprising:

one or more processors;

one or more storage devices having stored thereon, individually or in combination, instructions that, when executed by one or more processors, result in the following operations comprising:

storing at least a portion of an executable application program in a host system physical memory at a first host physical address;

instrumenting a copy of said portion of said executable application program and storing said instrumented copy in said host system physical memory at a second host physical address;

setting a corresponding access permission to read only for said first host physical address and setting a corresponding access permission to execute only for said second host physical address;

executing said instrumented copy or reading said portion of said executable application program based, at least in part, on said access permissions;

generating a first extended page table associated with said first host physical address and a second extended page table associated with said second host physical address; and instrumenting a memory scanner with a first instruction, said first instruction configured to select said first extended page table, wherein said memory scanner is configured to read said portion of said executable application program and said first instruction is configured to be executed prior to said memory scanner reading said portion of said executable application program.

9. The system of claim 8, wherein the instructions result in the following additional operations comprising:

generating a page fault in response to an attempt to read said second host physical address or an attempt to execute said portion of said executable application program stored at said first host physical address.

10. The system of claim 9, wherein the instructions result in the following additional operations comprising:

determining a type of said page fault; and updating an extended page table entry to correspond to said second host physical address if said page fault is an execute fault or to correspond to said first host physical address if said page fault is a read fault.

11. The system of claim 8, wherein a memory scanner is configured to read said portion of said executable application program.

12. The system of claim 8, wherein the instructions result in the following additional operations comprising:

instrumenting said memory scanner with a second instruction, said second instruction configured to select said second extended page table, wherein said second instruction is configured to be executed after said memory scanner has read said portion of said executable application program.

13. The system of claim 8, wherein the instructions result in the following additional operations comprising:

monitoring execution of said executable application program using said instrumented copy wherein said monitoring is configured to detect malware.

14. The system of claim 8, wherein the instructions result in the following additional operations comprising:

generating a first extended page table associated with said first host physical address and a second extended page table associated with said second host physical address;

generating a page fault in response to an attempt to read said second host physical address or an attempt to execute said portion of said executable application program stored at said first host physical address; and selecting one of said first and second extended page tables in response to the page fault.

15. A system, comprising:

host physical memory; and a processor configured to:

store at least a portion of an executable application program in said host system physical memory at a first host physical address;

instrument a copy of said portion of said executable application program and store said instrumented copy in said host system physical memory at a second host physical address;

set a corresponding access permission to read only for said first host physical address and set a corresponding access permission to execute only for said second host physical address; and execute said instrumented copy or read said portion of said executable application program based, at least in part, on said access permissions;

generate a first extended page table associated with said first host physical address and a second extended page table associated with said second host physical address; and instrument a memory scanner with a first instruction, said first instruction configured to select said first extended page table, wherein said memory scanner is configured to read said portion of said executable application program and said first instruction is configured to be executed prior to said memory scanner reading said portion of said executable application program.

16. The system of claim 15, wherein the processor is further configured to:

generate a page fault in response to an attempt to read said second host physical address or an attempt to execute said portion of said executable application program stored at said first host physical address.

17. The system of claim 16, wherein the processor is further configured to:

determine a type of said page fault; and updating an extended page table entry to correspond to said second host physical address if said page fault is an execute fault or to correspond to said first host physical address if said page fault is a read fault.

18. The system of claim 15, wherein the processor is further configured to:

instrument said memory scanner with a second instruction, said second instruction configured to select said second extended page table, wherein said second instruction is configured to be executed after said memory scanner has read said portion of said executable application program.

19. The system of claim 15, wherein the processor is further configured to:

monitor execution of said executable application program using said instrumented copy, said monitoring is configured to detect malware.

* * * * *

UNITED STATES PATENT AND TRADEMARK OFFICE

CERTIFICATE OF CORRECTION

PATENT NO. : 8,479,295 B2
APPLICATION NO. : 13/076378
DATED : July 2, 2013
INVENTOR(S) : Ravi L. Sahita et al.

It is certified that error appears in the above-identified patent and that said Letters Patent is hereby corrected as shown below:

In the Claims

In column 15, line 51, in claim 8, before "system" insert -- A --.

Signed and Sealed this
Third Day of September, 2013

Teresa Stanek Rea
*Acting Director of the United States Patent and Trademark Office*